United States Patent
Seo et al.

(10) Patent No.: US 10,198,592 B2
(45) Date of Patent: Feb. 5, 2019

(54) METHOD AND SYSTEM FOR COMMUNICATING HOMOMORPHICALLY ENCRYPTED DATA

(71) Applicants: SAMSUNG ELECTRONICS CO., LTD., Suwon-si, Gyeonggi-do (KR); SEOUL NATIONAL UNIVERSITY R&DB FOUNDATION, Seoul (KR)

(72) Inventors: Jae-Woo Seo, Suwon-si (KR); Jung-Hee Cheon, Seoul (KR); Mi-Ran Kim, Seoul (KR); Myung-Sun Kim, Uiwang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 337 days.

(21) Appl. No.: 15/010,738

(22) Filed: Jan. 29, 2016

(65) Prior Publication Data
US 2017/0004324 A1 Jan. 5, 2017

(30) Foreign Application Priority Data
Jul. 2, 2015 (KR) .................. 10-2015-0094823

(51) Int. Cl.
*G06F 21/62* (2013.01)
*H04L 9/00* (2006.01)
*H04L 9/06* (2006.01)

(52) U.S. Cl.
CPC .......... *G06F 21/6227* (2013.01); *H04L 9/008* (2013.01); *H04L 9/0618* (2013.01)

(58) Field of Classification Search
CPC ... G06F 21/6227; G06F 21/62; H04L 9/0618; H04L 9/008; H04L 9/06; H04L 9/00
USPC ............. 380/30, 239, 281, 284, 26; 713/190
See application file for complete search history.

(56) References Cited

U.S. PATENT DOCUMENTS

| | | | |
|---|---|---|---|
| 2010/0146299 A1* | 6/2010 | Swaminathan | ... G06F 17/30666 713/189 |
| 2011/0264920 A1 | 10/2011 | Rieffel et al. | |
| 2013/0046974 A1 | 2/2013 | Kamara et al. | |
| 2016/0323098 A1* | 11/2016 | Bathen | ............ H04L 9/008 |

FOREIGN PATENT DOCUMENTS

| | | |
|---|---|---|
| JP | 2011-232727 | 11/2011 |
| KR | 10-2014-0050477 | 4/2014 |

OTHER PUBLICATIONS

D. Boneh et al., "Private Database Queries Using Somewhat Homomorphic Encryption", ACNS 13 Proceedings of the 11th international conference on Applied Cryptography and Network Security, Nov. 30, 2012, pp. 102-118.
K. Lauter et al., "Can homomorphic encryption be practical?", ACNS 2011, 18 pages.

* cited by examiner

*Primary Examiner* — Ashokkumar B Patel
*Assistant Examiner* — Quazi Farooqui
(74) *Attorney, Agent, or Firm* — Nixon & Vanderhye P.C.

(57) ABSTRACT

A method for managing data by an electronic device is provided. The method includes receiving first data inputted from a user, generating second data by encrypting the first data using a public key, generating a query comprising the second data, transmitting the query to a server, receiving third data corresponding to the query from the server, generating fourth data by decrypting the third data using a secret key corresponding to the public key, and outputting the fourth data.

12 Claims, 5 Drawing Sheets

METHOD AND SYSTEM FOR COMMUNICATING HOMOMORPHICALLY ENCRYPTED DATA

CROSS-REFERENCE TO RELATED APPLICATION

This application is based on and claims priority 35 U.S.C. § 119 to a Korean patent application filed in the Korean Intellectual Property Office on Jul. 2, 2015 and assigned Serial No. 10-2015-00094823, the disclosure of which is incorporated by reference herein in its entirety.

TECHNICAL FIELD

The present disclosure relates generally to a method and apparatuses for managing data.

BACKGROUND

Recently, there has been a security issue for data stored in an external storage space such as a cloud storage. To protect the data stored in the external storage space, access control or key management is mainly used, which is effective for preventing an external intruder, but fails to fundamentally prevent an operator of the external storage space from maliciously using the stored data. Moreover, if an external user gets a key for accessing the external storage space, the external use may maliciously use the data stored in the external storage space without permission.

To prevent a party other than a person who stores data in the external storage space from maliciously using the data stored in the external storage space, the data may be stored after being encrypted. However, when the data is encrypted and stored, even the person having stored the data in the external storage space may not easily find out the data by using a general data search method, undergoing difficulties in managing the data.

The above information is presented as background information only to assist with an understanding of the present disclosure. No determination has been made, and no assertion is made, as to whether any of the above might be applicable as prior art with regard to the present disclosure.

SUMMARY

Various examples of the present disclosure provide a method and apparatuses for managing encrypted data stored in an external storage space while maintaining an encrypted state of the encrypted data.

According to various example embodiments of the present disclosure, a method for managing data by an electronic device is provided, the method including receiving first data inputted from a user, generating second data by encrypting the first data using a public key, generating a query including the second data, transmitting the query to a server, receiving third data corresponding to the query from the server, generating fourth data by decrypting the third data using a secret key corresponding to the public key, and outputting the fourth data.

According to various example embodiments of the present disclosure, an electronic device for managing data is provided, the electronic device including a communication interface comprising communication circuitry and a processor configured, if first data is inputted from a user, to generate second data by encrypting the first data, using a public key, to generate a query including the second data, to transmit the query to a server, to receive third data corresponding to the query from the server, to generate fourth data by decrypting the third data using a secret key corresponding to the public key, and to output the fourth data.

According to various example embodiments of the present disclosure, a method for managing data by a server is provided, the method including receiving a query including first data from an electronic device, converting the query into a logic for searching for data based on a command included in the query, determining second data satisfying the logic, and transmitting the second data to the electronic device as a response corresponding to the query, in which each of the first data and the second data is homomorphically encrypted by the electronic device using a public key.

According to various example embodiments of the present disclosure, a server for managing data is provided, the server including a communication interface including communication circuitry, the communication interface configured to receive a query including first data from an electronic device and a processor configured to convert the query into a logic for searching for data based on a command included in the query, to determine second data satisfying the logic, and to control the communication interface to transmit the second data to the electronic device as a response corresponding to the query, in which each of the first data and the second data is homomorphically encrypted by the electronic device using a public key.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

Aspects, advantages and features of the disclosure will be discussed in the following detailed description, with reference to the appended drawings, in which like reference numerals refer to like elements, and wherein.

DETAILED DESCRIPTION

Figure 1:
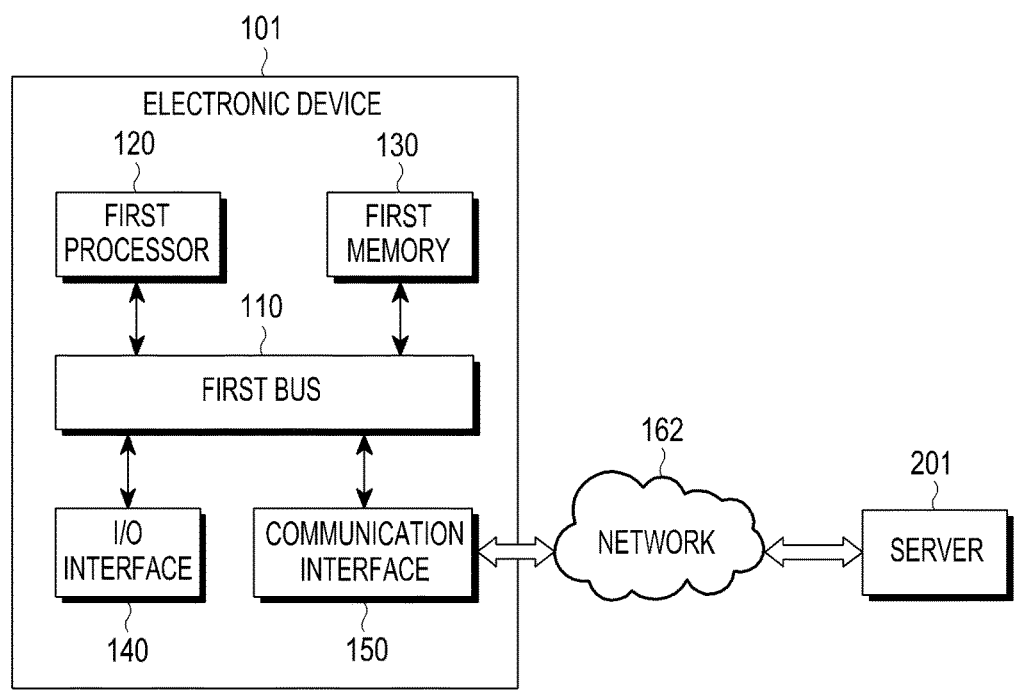
FIG. 1 is a block diagram illustrating an example network environment including an electronic device accord.

Hereinafter, various example embodiments of the present disclosure will be disclosed with reference to the accompanying drawings. However, the detailed description is not intended to limit the present disclosure to any particular example embodiments, and it should be understood as including various modifications, equivalents, and/or alternatives according to the example embodiments of the present disclosure.

In the present disclosure, an expression such as "having," "may have," "comprising," or "may comprise" indicates existence of a corresponding characteristic (such as an element such as a numerical value, function, operation, or component) and does not exclude existence of additional characteristic.

In the present disclosure, an expression such as "A or B," "at least one of A or/and B," or "one or more of A or/and B" may include all possible combinations the listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used in various example embodiments may represent various elements regardless of order and/or importance and do not limit corresponding elements. The expressions may be used for distinguishing one element from another element. For example, a first user device and a second user device may represent different user devices regardless of order or importance. For example, a first element may be referred to as a second element without deviating from the scope of the present disclosure, and similarly, a second element may be referred to as a first element.

When it is described that an element (such as a first element) is "operatively or communicatively coupled" to or "connected" to another element (such as a second element), the element can be directly connected to the other element or can be connected to the other element through a third element. However, when it is described that an element (such as a first element) is "directly connected" or "directly coupled" to another element (such as a second element), it may indicate that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a general-purpose processor (such as a CPU or an application processor) that can perform a corresponding operation by executing at least one software program stored at an exclusive processor (such as an embedded processor) for performing a corresponding operation or at a memory device.

Terms defined in the present disclosure may be used to describe a specific example embodiment and may not have an intention to limit the scope of other example embodiments. When using in a description of the present disclosure and the appended claims, a singular form may include a plurality of forms unless it is explicitly differently represented. Entire terms including a technical term and a scientific term used here may have the same meaning as a meaning that may be generally understood by a person of ordinary skill in the art. It may be determined that generally using terms defined in a dictionary have the same meaning as or a meaning similar to that of a context of related technology and are not meant as an ideal or excessively formal meaning unless explicitly defined. Terms, including arbitrary terms, defined in the present disclosure cannot be construed to exclude the example embodiments.

An electronic device according to various example embodiments of the present disclosure may be a device including a communication function. For example, the electronic device may include at least one of a smart phone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, mobile medical equipment, a camera, and a wearable device, or the like. According to various example embodiments of the present disclosure, the wearable device may include at least one of an accessory type (e.g., a watch, a ring, a bracelet, an anklet, a necklace, glasses, contact lenses, or a head-mounted device (HMD)), fabrics, a clothing-integrated type (e.g., an electronic clothing), a body-attached type (e.g., a skin pad or a tattoo), and a body-implanted type (e.g., an implantable circuit), or the like.

According to some example embodiments, the electronic device may be a home appliance. The home appliance may include, for example, at least one of a television (TV), a digital video disk (DVD) player, audio equipment, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and an electronic frame, or the like.

According to another example embodiment, the electronic device may include at least one of various medical equipment (e.g., various portable medical measurement systems, such as a blood sugar measurement device, a heartbeat measurement device, a blood pressure measurement device, or a body temperature measurement device, magnetic resonance angiography (MRA), magnetic resonance imaging (MRI), computed tomography (CT), an imaging device, or an ultrasonic device), a navigation system, a global navigation satellite system (GNSS) receiver, an event data recorder (EDR), a flight data recorder (FDR), a vehicle infotainment device, electronic equipment for ships (e.g., navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, etc.), or the like.

According to some example embodiments, the electronic device may include a part of a furniture or building/structure, an electronic board, an electronic signature receiving device, a projector, and various measuring instruments (e.g., a water, electricity, gas, or electric wave measuring device), or the like. The electronic device according to various example embodiments of the present disclosure may be one of the above-listed devices or a combination thereof. The electronic device according to various example embodiments of the present disclosure may be a flexible device. It will be apparent to those of ordinary skill in the art that the electronic device according to various example embodiments of the present disclosure is not limited to the above-listed devices and may include new electronic devices according to technical development.

Hereinafter, an electronic device according to various example embodiments of the present disclosure will be described with reference to the accompanying drawings. Herein, the term "user" used in various example embodiments of the present disclosure may refer to a person who uses the electronic device or a device using the electronic device (e.g., an artificial intelligence electronic device).

FIG. 1 is a block diagram illustrating an example network environment including an electronic device. Referring to FIG. 1, a description will be made of an electronic device 101 in a network environment.

The electronic device 101 may include, for example, at least one of a first bus 110, a first processor (e.g., including processing circuitry) 120, a first memory 130, an input/output (I/O) interface (e.g., including input/output circuitry) 140, and a first communication interface (e.g., including communication circuitry) 150. According to some example embodiments, the electronic device 101 may omit at least one of the foregoing elements or may further include other elements.

The first bus 110 may include a circuit for interconnecting the elements 120 through 150 described above and for allowing communication (e.g., a control message and/or data) between the elements 120 through 190.

The first processor 120 may include processing circuitry including, for example, one or more of a central processing unit (CPU), an application processor (AP), and a communication processor (CP). The first processor 120 may be configured to perform operations or data processing for control and/or communication of, for example, at least one other elements of the electronic device 101.

According to an example embodiment, the first processor 120 may be configured to generate a public key or a secret key. The first processor 120 may be configured to encrypt data (plaintext) or decrypt encrypted data (ciphertext) using the public key or the secret key.

The first processor 120 may be configured to control the first communication interface 150 to transmit the public key to the server 201. The first processor 120 may be configured to control the first communication interface 150 to transmit the ciphertext to the server 201.

According to an example embodiment, the first processor 120 may be configured to generate a query based on a user input. For example, when a user requests searching for data stored in the server 201 through the I/O interface 140. The first processor 120 may be configured to generate a query reflecting the user's request. The first processor 120 may be configured to encrypt a value (e.g., a search range) included in the request using, for example, the public key, and to generate a query including the encrypted value and a command for executing an operation corresponding to the user's request.

For example, it may be assumed that an annual salary for each employee is input in the server 201. The user of the electronic device 101 may request the electronic device 101 to let the user know the number of employees earning an annual salary of about fifty thousand (50000) dollars-about one hundred thousand (100000) dollars. The first processor 120 of the electronic device 101 may be configured to generate the query based on the user's request. Before generating the query, the first processor 120 may be configured to encrypt parameters input by the user, e.g., a range of an annual salary (50000 dollars-100000 dollars) and a search item "employee", using, for example, a public key. The first processor 120 may be configured to combine the encrypted parameters with a command for executing an operation (counting the number of employees earning the annual salary of 50000 dollars-100000 dollars), thereby generating the query to be transmitted to the server 201. The first processor 120 may be configured to encrypt the parameters (e.g., "50000 dollars-100000 dollars", "employee", and so forth) using, for example, homomorphic encryption.

According to an example embodiment, the first processor 120 may be configured to decrypt a result value received from the server 201 in response to the query using, for example, a secret key. The result value received from the server 201 may, for example, be a homomorphic cipher.

For example, it is assumed that the number of employees earning an annual salary of 50000 dollars-100000 dollars is 10. The server 201 may output a homomorphic cipher "3482101" as the number of employees earning an annual salary of 50000 dollars-100000 dollars. The first processor 120 may be configured to decrypt the homomorphic cipher "3482101" using a secret key, and to obtain "10" as a decrypted value. Thus, the first processor 120 may be configured to output "10" to the user as the number of employees earning an annual salary of 50000 dollars-100000 dollars. According to an example embodiment, the first processor 120 may be configured to output "10", which is the number of employees earning an annual salary of 50000 dollars-100000 dollars, through a screen included in the I/O interface 140.

The first memory 130 may include, for example, a volatile and/or nonvolatile memory. The first memory 130 may store, for example, commands or data associated with at least one other elements of the electronic device 101.

According to an example embodiment of the present disclosure, the public key and the secret key may be stored in the first memory 130 and data encrypted using the secret key or the public key, e.g., a homomorphic cipher, may also be stored in the first memory 130.

The I/O interface 140 serves as an interface for delivering a command or data input from a user or another external device to other element(s) of the electronic device 101. The I/O interface 150 may also output a command or data received from other element(s) of the electronic device 101 to a user or another external device.

According to an example embodiment, the I/O interface 140 may be implemented to include a display such as a touch screen to receive a touch, a gesture, proximity, or a hovering input, for example, using an electronic pen or a part of a body of a user. According to an example embodiment, if data received from the server 201 by the electronic device 101 is a ciphertext, the I/O interface 140 displays a plaintext into which the ciphertext is decrypted to the user. The ciphertext may be converted into the plaintext by being decrypted by the first processor 120.

The first communication interface 150 sets up communication, for example, between the electronic device 101 and an external device (e.g., a server 201). For example, the first communication interface 150 may be connected to a network 162 through wireless or wired communication to communicate with the external device (e.g., the server 201).

According to an example embodiment, the first communication interface 150 transits a public key generated by the first processor 120 to the server 201 under control of the first processor 120. The first communication interface 150 transmits a query generated by the first processor 120 to the server 201 and receives a response corresponding to the query from the server 201. The query or the response may be a ciphertext or data including the ciphertext.

The wireless communication may use, as a cellular communication protocol, for example, at least one of long term evolution (LTE), LTE-advanced (LTE-A), code division multiple access (CDMA), wideband CDMA (WCDMA), a universal mobile telecommunication system (UMTS), wireless broadband (WiBro), or global system for mobile communications (GSM)), or the like. The wireless communication may include, for example, short-range communication. The short-range communication may include at least one of wireless fidelity (WiFi), Bluetooth, near field communication (NFC), global navigation satellite system (GNSS), and so forth. The GNSS may include at least one of a global positioning system (GPS), a global navigation satellite system (Glonass), a Beidou navigation satellite system (hereinafter, "Beidou"), and Galileo, the European global satellite-based navigation system, or the like. Herein, "GPS" may be interchangeably used with "GNSS". The wired communication may include, for example, at least one of a universal serial bus (USB), a high definition multimedia interface (HDMI), a recommended standard (RS)-2032, and a plain old telephone service (POTS), or the like. The network 162 may include a telecommunications network, for example, at least one of a computer network (e.g., a local area network (LAN) or a wide area network (WAN)), Internet, and a telephone network, or the like.

Although not illustrated in FIG. 1, a display may be further included in the electronic device 101. The display may provide data decrypted by the first processor 120, for example, a plaintext or data including the plaintext, to the user by displaying the decrypted data. The display may include, for example, at least one of a liquid crystal display (LCD), a light-emitting diode (LED) display, an organic light-emitting diode (OLED) display, a micro electro mechanical system (MEMS) display, and an electronic paper display, or the like.

According to an example embodiment, when the electronic device 101 performs a function or service automatically or when requested, the electronic device 101 may request at least some related functions from another device (e.g., the server 201), instead of or in addition to executing the function or service itself. The other device (e.g., the server 201) executes the requested function or an additional function and delivers the result to the electronic device 101. The electronic device 101 provides the received result or provides a requested function or service by further processing the received result. To this end, for example, cloud computing, distributed computing, or client-server computing may be used.

An electronic device for managing data according to an example embodiment may include a communication interface comprising communication circuitry and a processor configured, if first data is inputted from a user, to generate second data by encrypting the first data, using a public key, to generate a query including the second data, to transmit the query to a server, to receive third data corresponding to the query from the server, to generate fourth data by decrypting the third data using a secret key corresponding to the public key, and to output the fourth data.

Figure 2:
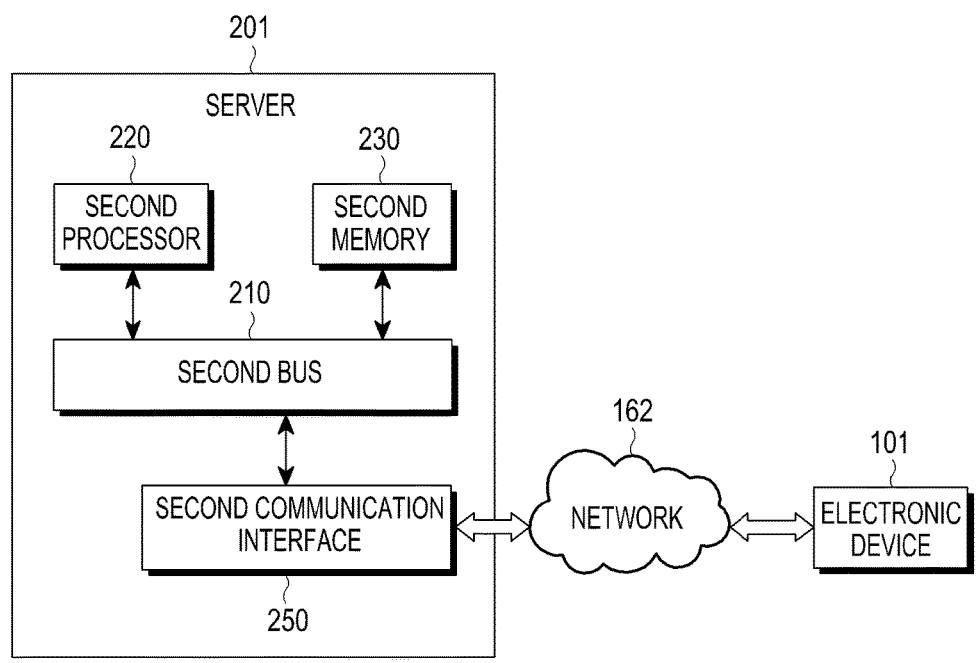
FIG. 2 is a block diagram illustrating an example server included in the network environment illustrated in FIG. 1.

FIG. 2 is a block diagram illustrating an example server 201 included in the network environment illustrated in FIG. 1.

The server 201 may include, for example, a second bus 210, a second processor (e.g., including processing circuitry) 220, a second memory 230, and a second communication interface (e.g., including communication circuitry) 250. In some example embodiments, the server 201 may omit at least one of the foregoing elements or may further include other elements.

The second bus 210 may include a circuit for interconnecting the elements 220, 230, and 250 described above and for allowing communication (e.g., a control message and/or data) among the elements 220, 230, and 250.

The second processor 220 may include processing circuitry including, for example, one or more of a central processing unit (CPU), an application processor (AP), and a communication processor (CP). The second processor 220 may be configured to operations or data processing for control and/or communication of, for example, at least one other elements of the server 201.

According to an example embodiment, the second processor 220 may be configured to encrypt data or to decrypt encrypted data using a public key received from the electronic device 101. The second processor 220 may be configured to analyze a query received from the electronic device 101 and to convert the query into a logic, e.g., a search logic. The second processor 220 may be configured convert the query into the logic using the public key. The query may include, for example, a particular value input to the electronic device 101, for example, by the user, for example, a parameter and a command. The second processor 220 may be configured to analyze the query to determine a method for processing the parameter included in the query. The second processor 220 may be configured to convert the query into the logic based on the determined parameter processing method. The second processor 220 may be configured to search for data (e.g., a ciphertext) stored in the second memory 230 or to perform an operation with respect to the data (e.g., the ciphertext) according to the logic. The second processor 220 may be configured to transmit one or more result values satisfying the logic to the electronic device 101 through the second communication interface 250 in response to the query.

According to an example embodiment, the second processor 220 may be configured to extract the command from the query received from the electronic device 101. The command corresponds to a method for processing the parameter included in the query, and a logic corresponding to each command may be stored in the second memory 230. According to an example embodiment, a logic table including logic corresponding to respective commands may be stored in advance in the second memory 230. The second processor 220 may be configured to convert the query received from the electronic device 101 into a logic using the logic table and the public key.

The second memory 230 may include, for example, a volatile and/or nonvolatile memory. The memory 230 may store, for example, commands or data associated with at least one other elements of the electronic device 201.

According to an example embodiment of the present disclosure, in the second memory 230 may be stored the public key received from the electronic device 101 and general data received from the electronic device 101, for example, non-encrypted data (a plaintext) or data encrypted (a ciphertext) by the electronic device 101. According to an example embodiment, the second memory 230 may have a database structure using a structured query language (SQL).

The second communication interface 250 sets up communication, for example, between the server 201 and an external device (e.g., the electronic device 101). For example, the second communication interface 250 may be connected to a network 162 through wireless or wired communication to communicate with the external device (e.g., the electronic device 101).

According to an example embodiment, the second communication interface 250 stores the public key received from the electronic device 101 to correspond to the electronic device 101. The second communication interface 250 receives the query from the electronic device 101 and transmits a response including a result value corresponding to the query to the electronic device 101.

The wireless communication may use, as a cellular communication protocol, for example, at least one of long term evolution (LTE), LTE-advanced (LTE-A), code division multiple access (CDMA), wideband CDMA (WCDMA), a universal mobile telecommunication system (UMTS), wireless broadband (WiBro), or global system for mobile communications (GSM)), or the like. The wireless communication may also include short-range communication, for example, may include at least one of WiFi, Bluetooth, NFC, GNSS, and so forth. The GNSS may include at least one of a GPS, a Glonass, Beidou, and Galileo, the European global satellite-based navigation system, or the like. Herein, "GPS" may be interchangeably used with "GNSS". The wired communication may include, for example, at least one of a USB, a HDM), a RS-2032, and a POTS, or the like. The network 162 may include a telecommunications network, for example, at least one of a computer network (e.g., a LAN or a WAN), Internet, and a telephone network, or the like.

The server 201 may be a device of the same or similar type as or a different type than the electronic device 101. According to an example embodiment of the present disclosure, the server 201 may include a group of one or more servers. According to various example embodiments, all or some of operations performed in the electronic device 101 may be performed in another electronic device or a plurality of electronic devices (e.g., the server 201). According to an example embodiment of the present disclosure, when the electronic device 101 has to perform a function or a service automatically or at the request, the electronic device 101 may request another device (e.g., the server 201) to perform at least some functions associated with the function or the service instead of or in addition to executing the function or the service. The server 201 may be implemented as one or more devices using cloud computing, distributed computing, or client-server computing.

A server for managing data according to an example embodiment may include a communication interface configured to receive a query including first data from an electronic device and a processor configured to convert the query into a logic for searching for data based on a command included in the query, to determine second data satisfying the logic, and to control the communication interface to transmit the second data to the electronic device as a response corresponding to the query, in which each of the first data and the second data is homomorphically encrypted by the electronic device using a public key.

Figure 3:
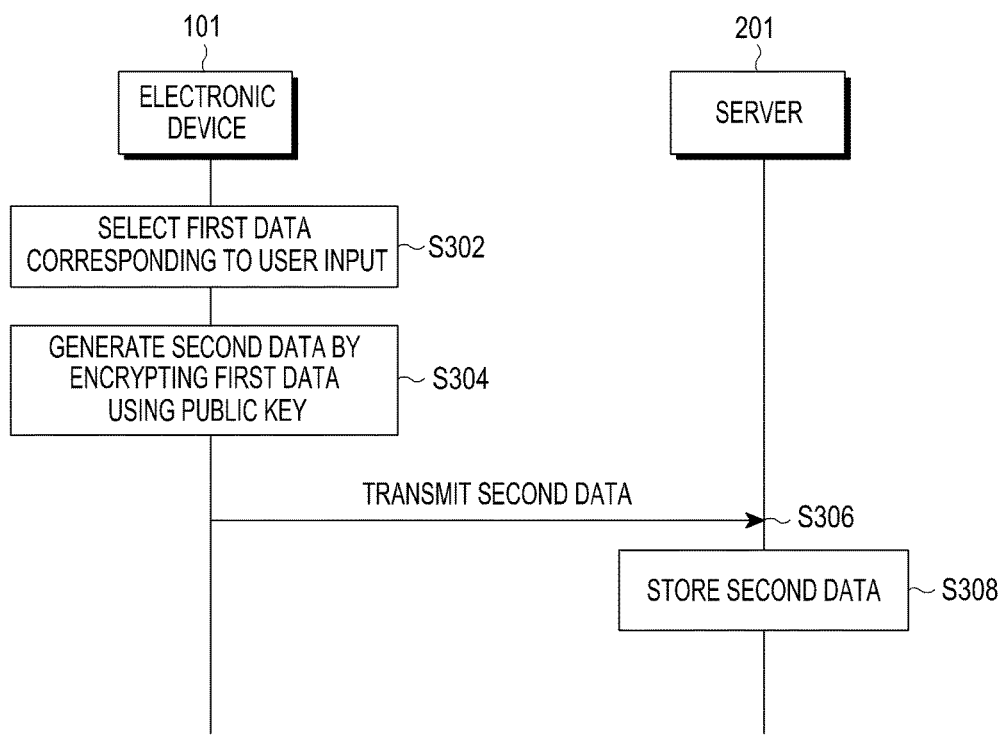
FIG. 3 is a diagram illustrating an example method for storing first data, which is a ciphertext, in a server by an electronic device.

FIG. 3 is a diagram illustrating an example method for storing first data, which is a ciphertext, in the server 201 by the electronic device 101.

Referring to FIG. 3, the electronic device 101 selects first data corresponding, for example, to a user input in operation S302. The first data may be non-encrypted data, for example, a plaintext.

The first processor 120 of the electronic device 101 may be configured to generate second data, which is a ciphertext wherein the first data is encrypted using a public key stored in the first memory 130, in operation S304. The second data may be generated by encrypting the first data using homomorphic encryption by the first processor 120.

Homomorphic encryption may include, for example, fully homomorphic encryption and somewhat homomorphic encryption. The first processor 120 may be configured to convert the first data into the second data by encrypting the first data using fully homomorphic encryption or somewhat homomorphic encryption, which is, for example, an algorithm for supporting addition and multiplication without decryption with respect to encrypted data.

The electronic device 101 transmits the second data generated in operation S304 to the server 201 in operation S306. The server 201 stores the second data to correspond to the electronic device 101 in operation S308. For example, the server 201 stores data (the second data) obtained by performing homomorphic encryption with respect to the first data.

Figure 4:
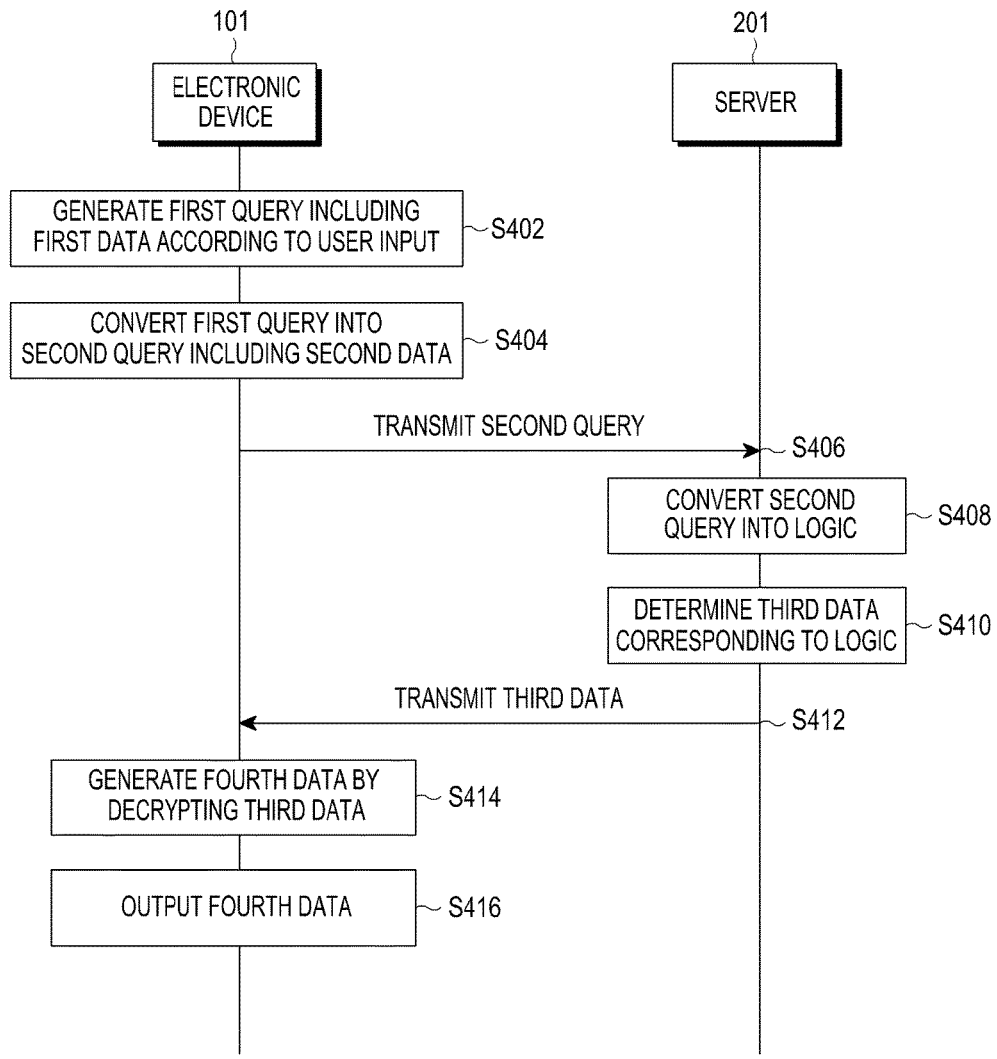
FIG. 4 is a diagram illustrating an example method for using ciphertexts stored in a server by an electronic device.

FIG. 4 is a diagram illustrating an example method for using ciphertexts stored in the server 201 by the electronic device 101.

Referring to FIG. 4, the first processor 120 of the electronic device 101 may be configured to generate a first query including first data according to a user input in operation S402. According to an example embodiment, the first query may, for example, be an SQL type query. The first query may include, for example, a command input from the user of the first electronic device 101, e.g., an operator indicating an operation such as addition, subtraction, multiplication, or division, or an operator indicating search. According to an example embodiment, the user inputs a search keyword or a search range to the electronic device 101 as the first data, for example, a parameter, prior to operation S402. For example, the first processor 120 may be configured to generate a first query 451 as expressed below using the first data.

[First Query]

$$\text{Select } A_{j1}, A_{j2}, A_{j3} \text{ from R where } A_{j0}=\alpha \qquad (451)$$

The first query 451 may be used to select (or extract) $A_{j1}$, $A_{j2}$, $A_{j3}$ including $A_{j0}=\alpha$ from R in a data table stored in the second memory 230 of the server 201 (FIG. 2).

The first processor 120 of the electronic device 101 may be configured to convert the first query into a second query in operation S404. The first processor 120 may be configured to generate second data by encrypting the first data (e.g., $A_{j0}, A_{j1}, A_{j2}, A_{j3}$, and $\alpha$ of the first query 451) except for a command (e.g., Select, from, and where in the first query 451). The first data may be converted into a ciphertext having a homomorphic encryption form using a public key by the first processor 120 of the electronic device 101. The second query indicates a query including the second data, which may, for example, be homomorphic-encrypted using the public key. For example, the first processor 120 may be configured to convert the first query 451 into a second query 452 as expressed below.

[Second Query]

$$\text{Select } \overline{A_{j1}}, \overline{A_{j2}}, \overline{A_{j3}} \text{ from R where } \overline{A_{j0}}=\overline{\alpha} \qquad (452)$$

In the second query 452, $\overline{A_{j0}}, \overline{A_{j1}}, \overline{A_{j2}}, \overline{A_{j3}}$, and $\overline{\alpha}$ each may be data obtained by homomorphically encrypting $A_{j0}, A_{j1}, A_{j2}, A_{j3}$, and $\alpha$ of the first query 451.

The electronic device 101 transmits the second query 452 to the server 201 in operation S406. The second processor 220 of the server 201 may be configured to analyze the second query and to convert the second query 452 into a logic in operation S408. According to an example embodiment, the second processor 220 may be configured to convert the second query 452 into logic by referring to a logic table included in the second memory 230. For example, the second processor 220 may be configured to convert the second query 452 into a logic 453 expressed below.

[Logic]

$$\text{equal } (\overline{A_{j0}}^{(i)}, \overline{\alpha}) \cdot (\overline{A_{j1}}^{(i)}, \overline{A_{j2}}^{(i)}, \overline{A_{j3}}^{(i)}) \qquad (453)$$

The logic 453 may be used to search the second memory 230 having an SQL structure, and the second processor 220 may be configured to analyze the second query 452 to convert the second query 452 into a logic for searching the second memory 230. According to an example embodiment, a logic command corresponding to each command included in the second query 452 may be set in advance. The logic command may, for example, refer to a command for processing the second data included in the logic 453, for example, "equal" in the logic 453.

According to an example embodiment, the second processor 220 may be implemented to include at least one of an equality circuit, a greater-than comparison circuit, and an integer addition circuit.

If the logic converted by the second processor 220 includes a command "comp", the second processor 220 may be configured to process the logic using the greater-than comparison circuit. If the logic includes a command "fadd", the second processor 220 may be configured to process the logic using the integer addition circuit. The second processor 220 may be configured to operate at least one of the equality circuit, the greater-than comparison circuit, and the integer addition circuit based on the logic command included in the logic into which the second query is converted, thus performing an operation corresponding to the logic.

If the logic includes the command "equal", the second processor 220 may be configured to process the logic using the equality circuit. For example, a scheme for the equality circuit to process $\mu$-bit integers x and y may be expressed as below.

$$\text{equal}(\overline{x}, \overline{y}) = \Pi_{i=0}^{\mu-1}(1+\overline{x}_i+\overline{y}_i) \tag{461}$$

For a result value of Equation 461, if a ciphertext $\overline{x}$ of x and a ciphertext $\overline{y}$ of y have the same plaintext x and y (x=y), the equality circuit may output $\overline{1}$ as a result value. In the above equation, $x_i$ indicates an $i^{th}$ bit of x, $\overline{x}_i$ indicates a ciphertext into which the $i^{th}$ bit of x is homomorphically encrypted, $y_i$ indicates an $i^{th}$ bit of y, and $\overline{y}_i$ indicates a ciphertext into which the $i^{th}$ bit of y is homomorphically encrypted. The ciphertexts $\overline{x}$ and $\overline{y}$ are expressed as below.

$$\overline{x} = E_{pk}(x_0, x_1, \ldots, x_{\mu-1})$$

$$\overline{y} = E_{pk}(y_0, y_1, \ldots, y_{\mu-1})$$

According to an example embodiment, $E_{pk}$ represents a public key encryption algorithm, meaning that parenthesized values are encrypted using a public key pk. The public key may be encrypted in the form of a homomorphic cipher. As such, Equation 461 includes the ciphertexts $\overline{x}$ and $\overline{y}$, and the equality circuit calculates a ciphertext ($e=1+\overline{x}+\overline{y}$), which is an output value of Equation 461. The ciphertext e may be expressed as below.

$$e = E_{pk}(1 \oplus x_0 \oplus y_0, \ldots, 1 \oplus x_{\mu-1} \oplus y_{\mu-1}) \tag{462}$$

According to an example embodiment, the second processor 220 includes the ciphertext e 462 (for example, third data) in a response corresponding to a query received from the electronic device 101, e.g., in every slot of a response message, by using permutation. The electronic device 101 may be configured to re-arrange the slots in the response message including the result value received from the server 201, that is, the ciphertext e 462, thus extracting the ciphertext e 462 from the response message. According to an example embodiment, the processor 120 of the electronic device 101 may be configured to perform homomorphic multiplication with respect to the ciphertext e 462 log $\mu$ times, thus decrypting the ciphertext e 462.

If the logic includes the command "comp", the second processor 220 may be configured to process the logic using the greater-than comparison circuit. For example, the greater-than comparison circuit may process $\mu$-bit integers x and y in a manner expressed by comp($\overline{x}$, $\overline{y}$) 471 as below.

$$\text{comp}(\overline{x}, \overline{y}) = \overline{c}_{\mu-1} \tag{471}$$

In Equation 471, $\overline{c}_i$ may be calculated using Equation 472 expressed below.

$$\overline{c}_i = (1+\overline{x}_i) \cdot \overline{y}_i + (1+\overline{x}_i+\overline{y}_i) \cdot \overline{c}_{i-1} \text{ for } i \geq 1 \tag{472}$$

$\overline{c}_i$ for i=0, that is, $\overline{c}_0$ may be calculated using Equation 473 expressed below.

$$\overline{c}_0 = (1+\overline{x}_0) \cdot \overline{y}_0 \text{ for } i=0 \tag{473}$$

$x_i$ represents an $i^{th}$ bit of x, and $\overline{x}_i$ represents a homomorphic ciphertext for 1-bit $x_i$. For x≥y, comp($\overline{x}$, $\overline{y}$) 471 is $\overline{0}$, and for x<y, comp($\overline{x}$, $\overline{y}$) 471 is $\overline{1}$. $\overline{0}$ is a homomorphic ciphertext of 0, and $\overline{1}$ is a homomorphic ciphertext of 1.

The greater-than comparison circuit outputs a result of comparing two or more values by using:

$$\overline{c}_{\mu-1} = (1+\overline{x}_{\mu-1}) \cdot \overline{y}_{\mu-1} + \Sigma_{i=0}^{\mu-2}(1+\overline{x}_i) \cdot \overline{y}_i \cdot d_{i+1} + d_{i+2} + \ldots + d_{\mu-1} \tag{474},$$

where $d_j = (1+\overline{x}_j+\overline{y}_j)$ for $j \geq 1$

According to an example embodiment, the second processor 220 may be configured to obtain, as a result value, a ciphertext including an operation result of comp($\overline{x}$, $\overline{y}$) 471 in every slot of the message. The second processor 220 performs the following operations with respect to the ciphertexts $\overline{x}$ and $\overline{y}$.

$$C_1 = (1+\overline{x}) \cdot \overline{y}$$

$$C_2 = 1+\overline{x}+\overline{y}$$

According to an example embodiment, $C_1$ may be calculated as below.

$$C_1 = E_{pk}((1 \oplus x_0) \wedge y_0, \ldots, (1 \oplus x_{\mu-1}) \wedge y_{\mu-1})$$

According to an example embodiment, the second processor 220 includes the ciphertext (that is, third data) $C_1$ or $C_2$ in every slot of the response message corresponding to the query received from the electronic device 101 by using permutation. The electronic device 101 extracts the response message from the result value received from the server 201, that is, the ciphertext $C_1$ or $C_2$. According to an example embodiment, the processor 120 of the electronic device 101 may be configured to perform homomorphic multiplication with respect to the ciphertext $C_1$ or $C_2$ 2$\mu$ times, thereby decrypting the ciphertext $C_1$ or $C_2$.

If the logic includes "fadd", the second processor 220 may be configured to process the logic using the integer addition circuit. For example, a way for the integer addition circuit to process the $\mu$-bit integers x and y using zero padding may be expressed as below.

$$\text{fadd}_v(\overline{x}, \overline{y}) = (\overline{s}_0, \overline{s}_1, \ldots, \overline{s}_{v-1}) \tag{481}$$

where $\overline{s}_i$ may be calculated as below.

$$\overline{s}_i = \overline{x}_i + \overline{y}_i + \overline{c}_{i-1} \tag{482}$$

where $\overline{c}_i$ may be calculated as below.

$$\overline{c}_i = (\overline{x}_i \cdot \overline{y}_i) + ((\overline{x}_i + \overline{y}_i) \cdot \overline{c}_{i-1}) \text{ for } i \geq 1 \tag{483}$$

In Equations 481, 482, and 483 above, $x_i$ represents an $i^{th}$ bit of x, and $\overline{x}_i$ indicates a homomorphic ciphertext of $x_i$. Likewise, $y_i$ indicates an $i^{th}$ bit of y, and $\overline{y}_i$ indicates a homomorphic ciphertext of $y_i$. The second processor 230 may be configured to output v ciphertexts s as a result value of fadd$_v$($\overline{x}$, $\overline{y}$).

In Equation 482, $\overline{s}_0$ and $\overline{c}_0$ may be calculated as below.

$$\overline{s}_0 = \overline{x}_0 + \overline{y}_0$$

$$\overline{c}_0 = \overline{x}_0 \cdot \overline{y}_0$$

According to an example embodiment, $\bar{s}_l$ may be calculated using:

$$\bar{s}_l = \bar{x}_l + \bar{y}_l + \Sigma_{j=0}^{i-1} t_{i,j} \quad (484),$$

where $t_{i,j}$ and $t_{i,j-1}$ may be calculated as below.

$$t_{i,j} = (x_i \cdot y_i) \cdot \Pi_{j+1 \leq k \leq i-1} (\bar{x}_k + \bar{y}_k) \text{ for } j < i-1 \quad (485)$$

$$t_{i,j-1} = \bar{x}_{l-1} \cdot \bar{y}_{l-1} \quad (486)$$

The operation circuit may calculate a ciphertext $\text{fadd}_v(\bar{x}, \bar{y})$, which is an output value of Equation 481, including ciphertexts $\bar{x}_l$ and $\bar{y}_l$. The ciphertext may be expressed as below.

$$s = E_{pk}(s_0, s_1, \ldots, s_{v-1}) \quad (487)$$

According to an example embodiment, the second processor 220 includes the ciphertext s 487 (for example, the third data) in every slot of a response message corresponding to a query received from the electronic device 101 using permutation. The electronic device 101 re-arranges the slots in the response message including a result value, that is, the ciphertext s 487, received from the server 201, thus extracting the ciphertext s 487 from the response message. According to an example embodiment, the processor 120 of the electronic device 101 may be configured to perform homomorphic multiplication with respect to the ciphertext s 487 3v times to decrypt the ciphertext s 487.

According to an example embodiment, once the third data is determined in operation S410, the second communication interface 250 of the server 201 transmits the third data to the electronic device 101 in operation S412. The electronic device 101 generates fourth data by decrypting the third data in operation S414. The data stored in the server 201 may be a ciphertext homomorphically encrypted using a public key. Thus, the third data transmitted from the server 201 to the electronic device 101 may also be a ciphertext homomorphically encrypted using a public key. The electronic device 101 decrypts the third data by using a secret key stored, for example, in the first memory 130. The fourth data may, for example, be a plaintext into which the ciphertext in the form of a homomorphic cipher is decrypted, and the electronic device 101 outputs the fourth data, which is the plaintext, in operation S416. For example, the electronic device 101 provides the fourth data, to the user as a response to the first query through a display (not shown).

Figure 5:
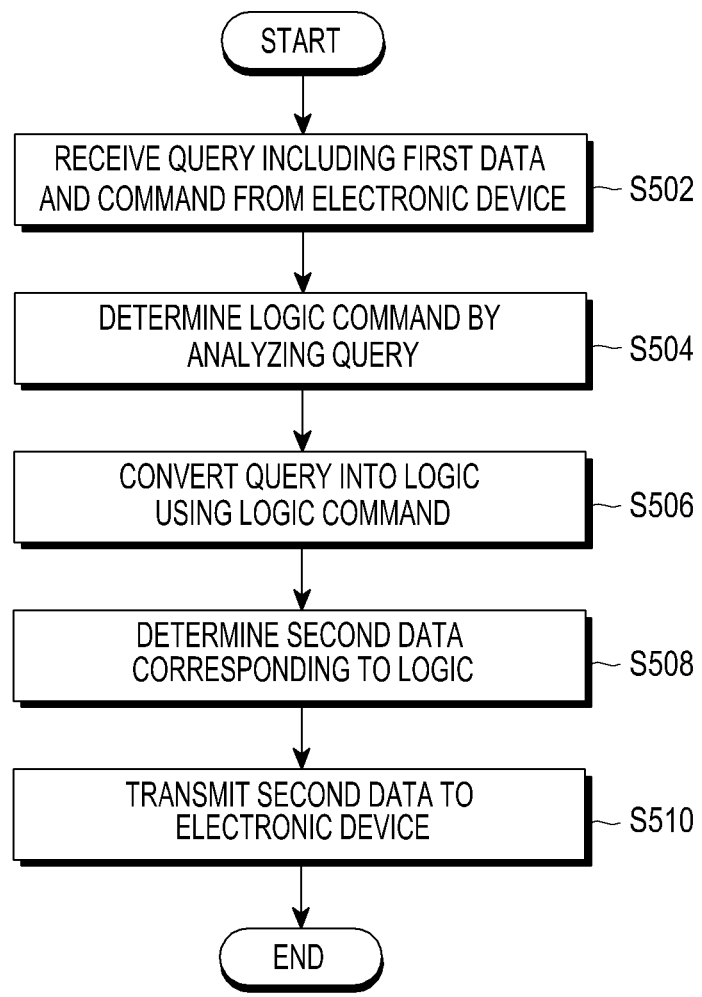
FIG. 5 is a flowchart illustrating an example of processing a request from an electronic device by a server.

FIG. 5 is a flowchart illustrating an example of processing a request from an electronic device by a server.

Referring to FIG. 5, the server 201 receives a query including first data, which is a ciphertext, and a command from the electronic device 101 in operation S502. The server 201 analyzes the query to determine a logic command corresponding to the query in operation S504. The server 201 converts the query into a logic by using the logic command in operation S506.

For example, it is assumed that the query generated by the electronic device 101 is a simple selection query (e.g., $\overline{Q_1}$). $\overline{Q_1}$ may be defined as below.

$$\overline{Q_1} \rightarrow \text{select} \overline{A_{J1}}, \overline{A_{J2}}, \ldots, \overline{A_{JS}}, \text{ from } R, \text{ where } \overline{A_{J0}} = \alpha$$

The second processor 220 of the server 201 may be configured to analyze the query $\overline{Q_1}$ to determine to convert the query $\overline{Q_1}$ into an equal logic $\overline{Q_1}^*$. Thus, the second processor 220 may be configured to convert the query $\overline{Q_1}$ into the equal logic $\overline{Q_1}^*$ as below.

$$\overline{Q_1}^* \rightarrow \text{equal}(\overline{A_{J0}}^{(i)}, \alpha) \cdot (\overline{A_{J1}}^{(i)}, \ldots, \overline{A_{JS}}^{(i)})$$

For example, the query generated by the electronic device 101 is assumed to be a conjunctive selection query (e.g., $\overline{Q_2}$). $\overline{Q_2}$ may be defined as below.

$$\overline{Q_2} \rightarrow \text{select} \overline{A_{J1}}, \overline{A_{J2}}, \ldots, \overline{A_{JS}}, \text{ from } R, \text{ where } \overline{A_{J_1'}} = 1 \text{ and } \ldots \text{ and } \overline{A_{J_\tau'}} = \alpha_\tau$$

The second processor 220 of the server 201 may be configured to analyze the query $\overline{Q_2}$ to determine to convert the query $\overline{Q_2}$ into an equal logic $\overline{Q_2}^*$. Thus, the second processor 220 may be configured to convert the query $\overline{Q_2}$ into the equal logic $\overline{Q_2}^*$ as below.

$$\overline{Q_2}^* \rightarrow \prod_{k=1}^{\tau} \text{equal}\left(\overline{A_{J'}}^{(i)}, \alpha_k\right) \cdot \left(\overline{A_{J1}}^{(i)}, \ldots, \overline{A_{JS}}^{(i)}\right)$$

For example, the query generated by the electronic device 101 is assumed to be a disjunctive selection query (e.g., $\overline{Q_3}$). $\overline{Q_3}$ may be defined as below.

$$\rightarrow \text{select} \overline{A_{J1}}, \overline{A_{J2}}, \ldots, \overline{A_{JS}}, \text{ from } R, \text{ where } \overline{A_{J_1'}} = \alpha_1 \text{ and } \ldots \text{ and } \overline{A_{J_\tau'}} = \alpha_\tau$$

The second processor 220 of the server 201 may be configured to analyze the query $\overline{Q_3}$ to determine to convert the query $\overline{Q_3}$ into an equal logic $\overline{Q_3}^*$. Thus, the second processor 220 may be configured to convert the query $\overline{Q_3}$ into the equal logic $\overline{Q_3}^*$ as below.

$$\overline{Q_3}^* \rightarrow 1 + \prod_{k=1}^{\tau} \left(\text{equal}\left(\overline{A_{J'}}^{(i)}, \alpha_k\right) + 1\right) \cdot \left(\overline{A_{J1}}^{(i)}, \ldots, \overline{A_{JS}}^{(i)}\right)$$

For example, the query generated by the electronic device 101 is assumed to be a search-and-sum query (e.g., $\overline{Q_4}$). $\overline{Q_4}$ may be defined as below.

$$\overline{Q_4} \rightarrow \text{select sum}(\overline{A_{J1}}), \text{ from } R, \text{ where } \overline{A_{J0}} = \alpha$$

The second processor 220 of the server 201 may be configured to analyze the query $\overline{Q_4}$ to determine to convert the query $\overline{Q_4}$ into an equal logic $\overline{Q_4}^*$. Thus, the second processor 220 may be configured to convert the query $\overline{Q_4}$ into the equal logic $\overline{Q_4}^*$ as below.

$$\overline{Q_4}^* \rightarrow \text{fadd}_{\mu + \log N}(\text{equal}(\overline{A_{J0}}^{(i)}, \alpha)) \cdot \overline{A_{J1}}^{(i)}$$

For example, the query generated by the electronic device 101 is assumed to be a search-and-count query (e.g., $\overline{Q_5}$). $\overline{Q_5}$ may be defined as below.

$$\overline{Q_5} \rightarrow \text{select count}(*) \text{ from } R, \text{ where } \overline{A_{J0}} = \alpha$$

The second processor 220 of the server 201 may be configured to analyze the query $\overline{Q_5}$ to determine to convert the query $\overline{Q_5}$ into an equal logic $\overline{Q_5}^*$. Thus, the second processor 220 may be configured to convert the query $\overline{Q_5}$ into the equal logic $\overline{Q_5}^*$ as below.

$$\overline{Q_5}^* \rightarrow \text{fadd}_{\log N}(\text{equal}(\overline{A_{J0}}^{(i)}, \alpha))$$

For example, if the query generated by the electronic device 101 is a search-and-avg query, the second processor 220 may be configured to convert the query into a search-and-sum query and a search-and-count query, processes them, and transmits a result value (a ciphertext) to the electronic device 101 through the second communication interface 250. The first processor 120 of the electronic device 101 may be configured to decrypt the result value (the ciphertext) of the search-and-sum query using a secret key and to perform a division operation with respect to the decrypted result value using the result value of the search-and-count query to obtain an average of one or more data included in the plaintext, thus obtaining a final result value of the search-and-avg query. For example, the electronic device 101 may receive a sum of values that are to be averaged and the number of values and divide the sum of the values by the number of values, thus obtaining an average value. The server 201 may receive the average value from the electronic device 101.

For example, if the query generated by the electronic device 101 is a search-and-max query, the second processor 220 may be configured to repetitively apply a greater-than comparison circuit to a parameter included in the query to extract a ciphertext corresponding to a maximum value or a minimum value from the second memory 230. The server 201 transmits the ciphertext corresponding to the maximum value or the minimum value to the electronic device 101. The first processor 120 of the electronic device 101 may be configured to the ciphertext using a secret key, thus obtaining a final result value, that is, the maximum value or the minimum value.

In operation S508, the server 201 determines second data as a result value of the logic using the logic converted in operation S506. The data homomorphically encrypted using the public key is stored in the second memory 230 of the server 201, such that the second data may also be homomorphically encrypted data. The server 201 transmits the second data to the electronic device 101 in operation S510.

A method for managing data by an electronic device according to an example embodiment of the present disclosure may include receiving first data inputted from a user, generating second data by encrypting the first data using a public key, generating a query including the second data, transmitting the query to a server, receiving third data corresponding to the query from the server, generating fourth data by decrypting the third data using a secret key corresponding to the public key, and outputting the fourth data.

A method for managing data by a server according to an example embodiment of the present disclosure may include receiving a query including first data from an electronic device, converting the query into a logic for searching for data based on a command included in the query, determining second data satisfying the logic, and transmitting the second data to the electronic device as a response corresponding to the query, in which each of the first data and the second data is homomorphically encrypted by the electronic device using a public key.

As is apparent from the foregoing description, according to various example embodiments of the present disclosure, a method and apparatuses for managing encrypted data stored in an external storage device while maintaining an encrypted state of the encrypted data may be provided.

The example embodiments disclosed herein have been provided for description and understanding of disclosed subject matter, and are not intended to limit the scope of the present disclosure. Therefore, it should be understood that the scope of the present disclosure includes any change or other various example embodiments based on the technical spirit of the present disclosure.

What is claimed is:

1. A method for communicating encrypted data between an electronic device and a server, the method comprising:
   receiving, by a communication interface including communication circuitry, of the electronic device, first data inputted from a user;
   generating, by a processor, a query related to the first data;
   homomorphically encrypting, by the processor, the query;
   transmitting, by the communication interface, the homomorphically-encrypted query to the server;
   receiving second data corresponding to the homomorphically-encrypted query from the server, wherein the second data is homomorphically-encrypted data;
   generating, by the communication interface, third data by decrypting the second data; and
   displaying, by a display of the electronic device, the third data.

2. The method of claim 1, further comprising, prior to generating the query related to the first data:
   generating, by the processor, ciphertexts by homomorphically-encrypting one or more plaintexts using a public key; and
   transmitting, by the communication interface, the ciphertexts to the server.

3. The method of claim 2, wherein receiving the second data corresponding to the homomorphically-encrypted query comprises:
   receiving, by the communication interface, as the second data, at least a part of the ciphertexts transmitted to the server.

4. An electronic device for communicating encrypted data with a server, the electronic device comprising:
   a display;
   a communication interface comprising communication circuitry; and
   a processor comprising processing circuitry, the processor configured to:
   if first data is inputted from a user, generate a query related to the first data,
   homomorphically encrypt the query,
   control the communication interface to transmit the homomorphically-encrypted query to the server,
   control the communication interface to receive second data corresponding to the homomorphically-encrypted query from the server, wherein the second data is homomorphically-encrypted data,
   generate third data by decrypting the second data, and
   control the display to display the third data.

5. The electronic device of claim 4, wherein the processor is further configured to:
   generate ciphertexts by homomorphically-encrypting one or more plaintexts using a public key, and
   control the communication interface to transmit the ciphertexts to the server.

6. The electronic device of claim 5, wherein the communication interface is configured to receive, as the second data, at least a part of the ciphertexts transmitted to the server.

7. A method for communicating encrypted data between a server and an electronic device, the method comprising:
   receiving, by a communication interface comprising circuitry of the server, a homomorphically-encrypted query from the electronic device;
   converting, by a processor of the server, the homomorphically-encrypted query into a logic for searching for first data corresponding to the homomorphically-encrypted query, based on a command included in the homomorphically-encrypted query;
   determining, by the processor, the first data satisfying the logic, wherein the first data is homomorphically-encrypted data; and
   transmitting, by the communication interface, the first data to the electronic device, wherein the first data is decrypted by the electronic device and displayed on a display of the electronic device.

8. The method of claim 7, further comprising, prior to receiving the homomorphically-encrypted query from the electronic device, receiving, by the communication interface, a public key from the electronic device and storing the public key.

9. The method of claim 7, further comprising, prior to receiving the homomorphically-encrypted query from the electronic device, receiving, by the communication interface, ciphertexts into which one or more plaintexts are homomorphically-encrypted by the electronic device using the public key, and storing the ciphertexts.

10. The method of claim 7, wherein if the homomorphically-encrypted query is used to determine whether two values included in the decrypted first data match each other, the determination is made by:

$$\text{equal}(\bar{x},\bar{y})=\Pi_{i=0}^{\mu-1}(1+\bar{x_i}+\bar{y_i})$$

where i and ($\mu-1$) are natural numbers, the determination outputs 1 if x and y are the same as each other, and outputs 0 if x and y are different from each other, x and y are integers, $\bar{x}$ and $\bar{y}$ are encrypted values of x and y, $x_i$ represents an $i^{th}$ bit of x, $y_i$ represents an $i^{th}$ bit of y, $\bar{x_i}$ represents an encrypted value of $x_i$, and $\bar{y_i}$ represents an encrypted value of $y_i$.

11. The method of claim 7, wherein if the homomorphically-encrypted query is used to determine a greater value between two values included in the decrypted first data, the determination of the greater value between the two values is made using:

$$\text{comp}(\bar{x},\bar{y})=\bar{c_{\mu-1}}, \text{ where}$$

$$\bar{c_i}=(1+\bar{x_i})\cdot\bar{y_i}+(1+\bar{x_i}+\bar{y_i})\cdot\bar{c_{i-1}} \text{ for } i \geq 1$$

$$\bar{c_0}=(1+\bar{x_0})\cdot\bar{y_0} \text{ for } i=0$$

where i and ($\mu-1$) are natural numbers, the determination outputs a greater value between x and y included in the decrypted first data, x and y are integers, $\bar{x}$ and $\bar{y}$ are encrypted values of x and y, $x_i$ represents an $i^{th}$ bit of x, $y_i$ represents an $i^{th}$ bit of y, $\bar{x_i}$ represents an encrypted value of $x_i$, and $\bar{y_i}$ represents an encrypted value of $y_i$.

12. The method of claim 7, wherein if the homomorphically-encrypted query is used to add at least two values included in the decrypted first data, a determination of a sum of the at least two values is made using:

$$\text{fadd}_\upsilon(\bar{x}, \bar{y})=(\bar{s_0}, \bar{s_1}, \ldots, \bar{s_{\upsilon-1}}), \text{ where}$$

$$\bar{s_i}=\bar{x_i}+\bar{y_i}+\bar{c_{i-1}} \text{ and}$$

$$\bar{c_i}=(\bar{x_i}\cdot\bar{y_i})+((\bar{x_i}+\bar{y_i})\cdot\bar{c_{i-1}}) \text{ for } i \geq 1,$$

$$\bar{s_0}=\bar{x_0}+\bar{y_0} \text{ and } \bar{c_0}=\bar{x_0}\cdot\bar{y_0}$$

where i and ($\upsilon-1$) are natural numbers, the determination outputs a sum of x and y included in the decrypted first data, x and y are integers, $\bar{x}$ and $\bar{y}$ are encrypted values of x and y, $x_i$ represents an $i^{th}$ bit of x, $y_i$ represents an $i^{th}$ bit of y, $\bar{x_i}$ represents an encrypted value of $x_i$, and $\bar{y_i}$ represents an encrypted value of $y_i$.

* * * * *